United States Patent [19]
Sato et al.

[11] Patent Number: 5,884,530
[45] Date of Patent: Mar. 23, 1999

[54] SHIFT KNOB STRUCTURE

[75] Inventors: Yasuhiro Sato; Tsuyoshi Sotome; Masayuki Ito, all of Tokyo, Japan

[73] Assignee: Niles Parts Co., Ltd., Japan

[21] Appl. No.: 891,740

[22] Filed: Jul. 14, 1997

[30]       Foreign Application Priority Data

Jul. 16, 1996   [JP]   Japan .................................. 8-204174

[51] Int. Cl.⁶ ............................. F16H 59/04; F16H 63/38
[52] U.S. Cl. ........................... 74/473.23; 74/110; 74/503; 74/538; 403/359
[58] Field of Search ................. 74/110, 473.23, 74/538; 403/359

[56]            References Cited

U.S. PATENT DOCUMENTS 4,078,447   3/1978   Kato et al. ........................ 74/538 X 5,247,849   9/1993   Sata ................................ 74/473.23 X

FOREIGN PATENT DOCUMENTS 2-140065   11/1996   Japan .

*Primary Examiner*—Allan D. Herrman
*Attorney, Agent, or Firm*—Ronald P. Kananen; Rader, Fishman & Grauer

[57]              ABSTRACT

A shift knob structure having a press button 5 with an improved pressing operation. In order to prevent a looseness at the press button 5, a knob main body 1 of the shift knob structure is comprised of the press button 5 for use in operating a detent rod 7, and of a press button installing member 4 in which the press button 5 is movable toward or away from the detent rod 7. The press button 5 has a guide projection 5c at its circumferential part. The press button installing member 4 is formed with a guide groove 4g having a first width part 4g1 and a fourth width part 4g4 to which a guide projection 5c is engaged at the inner wall of the cylinder part 4d.

7 Claims, 5 Drawing Sheets

SHIFT KNOB STRUCTURE

BACKGROUND OF THE INVENTION

1. Field of the Invention

The present invention relates to a shift knob structure in which a pressing operation of a press button fitted to a shift knob of a shift lever installed in an automobile is improved.

2. Description of the Related Art

A conventional shift knob structure has been disclosed, for example, in Japanese Utility Model Laid-Open No. Hei 2-140065. In the conventional shift knob structure, a steel ball, a spring and a sliding member are used to eliminate a looseness of the pressing button and improve an operating characteristic of the pressing button.

However, the conventional shift knob has some problems in that the number of component parts and the number of assembling steps of the component parts are increased and their cost is increased due to the fact that separate members, such as a steel ball, a spring and a sliding member or the like, are installed at a detent button.

SUMMARY OF THE INVENTION

An object of the present invention is to solve the problems with the conventional shift knob structure described above.

More specifically, it is an object of the present invention to improve an operating characteristic of a pressing button of a shift knob by a method wherein a cylindrical cylinder member fitted to a main body of the knob is formed with a guide groove, and a guide projection engaged with the guide groove is formed at the pressing button.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems of the prior art described above, a shift knob structure is provided comprising a press button for use in operating a detent rod, a press button installing member for inserting the press button in such a way that it may be moved toward or away from the detent rod, and a knob main body having the press button installing member therein, wherein the press button is formed with a guide projection at its circumferential part, and the press button installing member has the guide projection engaged with an inner wall of the cylinder part and further formed with a guide groove having a first width part and a fourth width part.

In addition, the present invention is preferably made such that the guide projection is formed with a head part fitted to the first width part, and a rod-like part having the fourth width part fitted thereto.

The guide groove preferably forms both a second width part and a third width part between the first width part and the fourth width part, and a relation of a width (b1) of the first width part, a width (b2) of the second groove part, a width (b3) of the third width part, and a width (b4) of the fourth width part is defined as b1>b2>b3>b4.

The guide groove preferably forms an inclination surface between the first width part and the second width part and an inclination surface between the third width part and the fourth width part.

The guide projections are preferably formed at an upper surface and both side surfaces of the press button.

BRIEF DESCRIPTION OF THE DRAWINGS

The present invention will become more fully understood from the detailed description given hereinbelow and the accompanying drawings which are given by way of illustration only, and thus are not limitative of the present invention. In the drawings.

DETAILED DESCRIPTION OF THE PREFERRED EMBODIMENT

Figure 1:
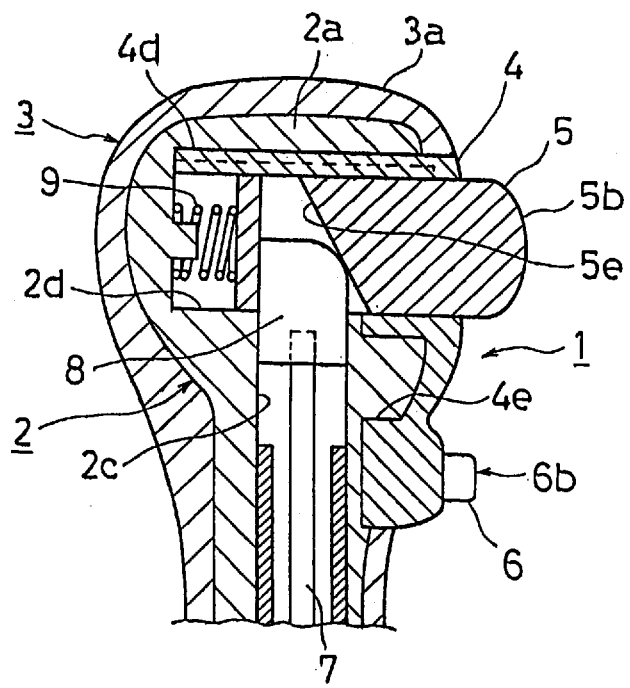
FIG. 1 is a central longitudinal section of a preferred embodiment of the present invention showing a substantial part of a knob main body.

A preferred embodiment of a switch knob structure according to the present invention will now be described in detail with reference to FIGS. 1 to 8 of the drawings.

A knob main body 1 of a shift lever knob has a skeleton 2 at an inner side and a cover member 3 at an outer side that covers the skeleton 2. The skeleton 2 and skin member 3 are molded in an integral construction. The knob main body 1 is comprised of a press button installing member 4 and of a press button 5, a switch 6, a detent rod 7, and a connector member 8, each of which is engaged with the press button installing member 4.

The skeleton 2 is made such that a handle part 2a and a hollow rod-like part 2b having the detent rod 7 inserted therein are made of hard resin. The skeleton 2, as shown in FIG. 1, has an axial hole 2c at its central part into which the detent rod 7 is inserted, and a mounting hole 2d into which the press button installing member 4 is fitted.

Figure 3:
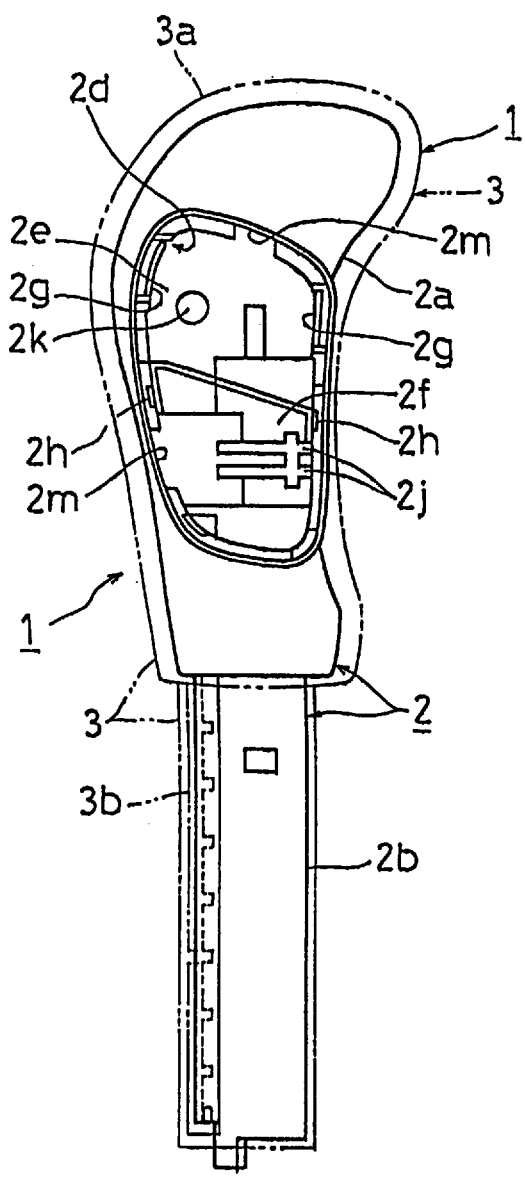
FIG. 3 invention and is a front elevational view of the preferred embodiment of the present invention for showing a skeleton.
Figure 4:
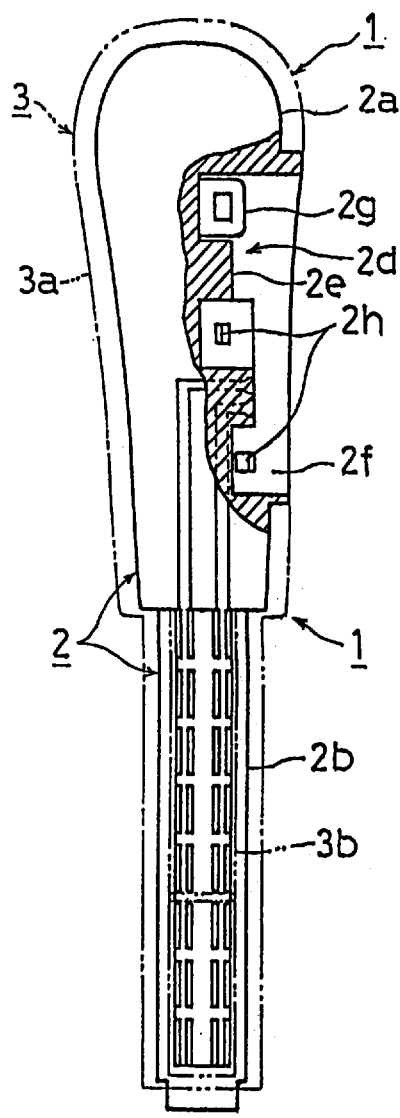
FIG. 4 is a side elevational view of the preferred embodiment of the present invention showing a skeleton with a partial sectional view.
Figure 5:
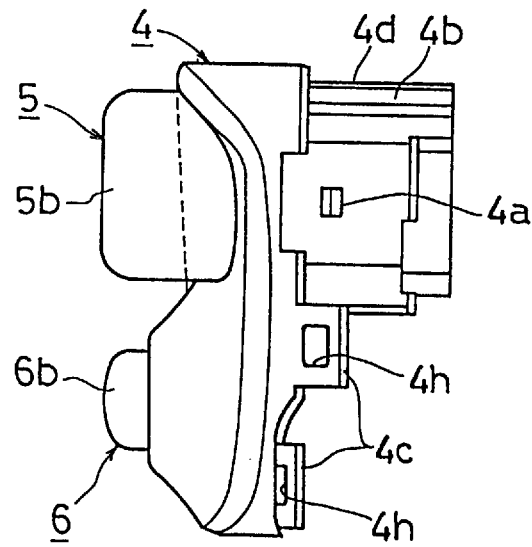
FIG. 5 is an enlarged side elevational view of the preferred embodiment of the present invention showing a press button installing member having a press button and a switch assembled therein.

The axial hole 2c is continuous with a press button mounting part 2e of the mounting hole 2d, as shown in FIG. 1. As shown in FIGS. 3 and 4, the mounting hole 2d is comprised of the press button mounting part 2e into which the press button 5 is mounted, and a switch mounting part 2f into which a switch 6 is mounted. The mounting hole 2d is formed with a plurality of engaging segments 2g, 2h at its inner wall to which an engaging claw 4a of the press button installing member 4 and an engaging piece 4c are engaged. The mounting hole 2d has a guiding groove 2m into which a guiding part 4b formed at an outer circumference of the press button installing member 4 is fitted.

Figure 6:
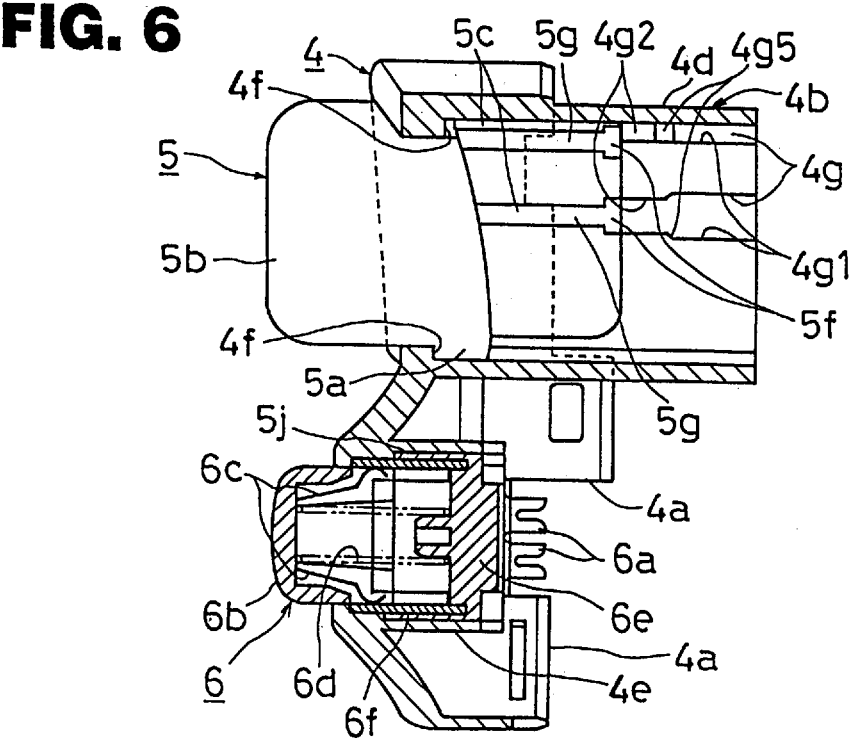
FIG. 6 is a central enlarged sectional view of the preferred embodiment of the present invention showing a press button installing member having a press button and a switch assembled therein.

The press button installing part 2e is a lateral hole communicating with the axial hole 2a. As shown in FIG. 3, the aforesaid-engaging part 2g, a guiding groove 2m and a supporting projection 2k for use in supporting one end of a spring 9 are present in the press button installing part 2e. The switch installing part 2f is formed with a holding groove 2j to which an electrical 2 conductive wire (not shown) connected to a terminal 6a of a switch 6, as shown in FIG. 6, is press-fitted. The engaging part 2g is comprised of a resilient tongue piece having a hole to which the engaging claw 4a is engaged, for example.

The engaging part 2h is comprised of a claw to which a hole 4h of the engaging piece 4c is engaged, for example. The holding groove 2j is comprised of a groove or a projection to which an end part of the electrical conductive wire is press fitted. The supporting projection 2k is formed at a central part of a deep wall of the press button installing part 2e.

The cover member 3 is made of vinyl chloride resin, foamed resin, or the like. The electrical conductive wire is mounted at the skeleton 2, and then the wire is mounted while surrounding a handle part 2a of the skeleton 2 and a hollow rod part 2b. The cover member 3 is comprised of a handle covering part 3a for covering an entire handle part 2a, and an electrical conductive wire covering part 3b for covering the hollow rod part 2b.

The covering member 3 of the handle covering part 3a is used for improving a touch feeling when a driver holds the knob main body 1. The electrical conductive wire covering part 3b is integrally formed with the handle covering part 3a and concurrently formed by a molding die. The electrical conductive covering part 3b may act as a fixing member for fixing the electrical conductive wire to the hollow rod part 2b and an insulating member for the electrical conductive wire.

The press button installing member 4 for use in fitting the switch 6 and the press button 5 is fixed to the skeleton 2 with the engaging claw 4a and the engaging piece 4c being engaged with engaging segments 2g, 2h, as shown in FIG. 3. The press button installing member 4 is a substantial lid-like member to be fitted to the mounting hole 2d, wherein a first cylindrical part 4d for use in arranging the press button 5, as shown in FIG. 6, and a second cylindrical part 4e for use in mounting the switch 6, are integrally formed.

As shown in FIGS. 1 and 6, the press button 5 is inserted from a rear side into the first cylindrical part 4d, and an operating part 5b is projected from the first cylindrical part 4d. A dropping prevention part 4f to which a stopper 5a of the press button 5 abuts is formed near an opening end of a front side of the first cylindrical part 4d. As shown in FIG. 6, the inner wall of the first cylindrical part 4d is formed with a guiding groove 4g engaged with a guide projection 5c in which the press button 5 is entered in a straight form when the press button 5 is pressed and operated. Both the stopper 5a and the guide projection 5c and both the dropping prevention part 4f and the guide groove 4g may also be acted together.

Figure 7:
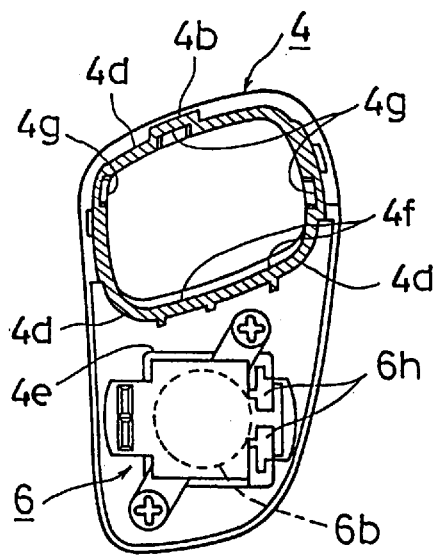
FIG. 7 is a rear side view of the preferred embodiment of the present invention showing a press button installing member having a switch assembled therein.

As shown in FIG. 6, the second cylindrical part 4e of the press button installing member 4 may act as a case body of the switch 6. A switch knob 6b and a coil spring 6d are inserted into the second cylindrical part 4e from its rear surface side through a movable contact piece 6c, and the second cylindrical part is closed by an electrode plate 6e. As shown in FIG. 7, the second cylindrical part 4e is made such that its front surface side is a circle which is coincided with a shape of the switch knob 6b, and its rear surface side has a cylinder shape with its sectional shape being square. Around the second cylindrical part 4e is arranged a supporting plate (not shown) for holding a lock pin (not shown) biased by a leaf spring (not shown).

As shown in FIGS. 6 and 7, the dropping prevention part 4f is a stepped part which is formed near a front side opening end of the first cylindrical part 4d. To the dropping prevention part 4f is press-contacted a stopper 5a of the press button 5 biased by the spring 9. As shown in FIG. 7, the guide grooves 4g are used for engaging with the guide projection 5c, and a plurality of guide grooves are formed at the inner wall of the first cylindrical part 4d. The guide grooves 4g are formed at three locations on the first cylindrical part 4d, such as on an inner ceiling surface and right and left side wall surfaces, for example.

Figure 2:
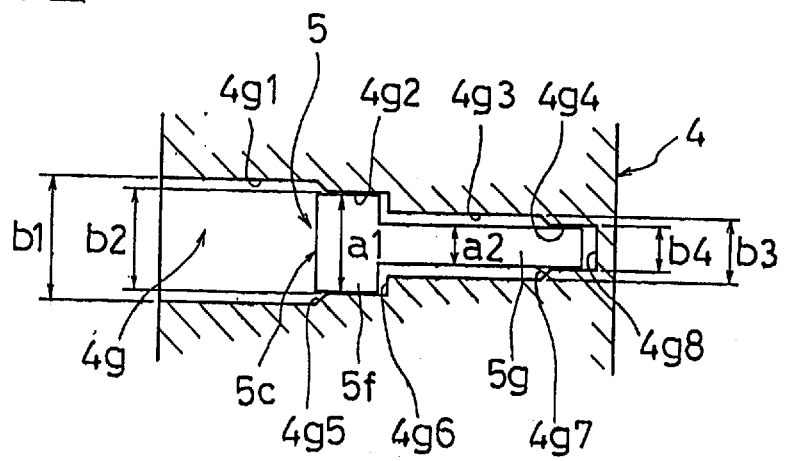
FIG. 2 is an illustrative view of the preferred embodiment of the present invention showing a relation between a guide of a press button and a guide groove of a press button installing member.
Figure 8:
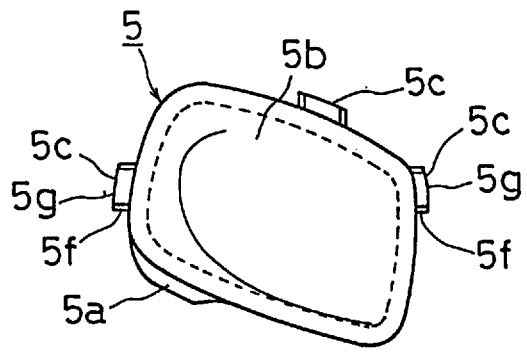
FIG. 8 is an enlarged front elevational view of the preferred embodiment of the present invention showing a press button.

The press button 5 is an operating member for use in moving the detent rod inserted into the hollow rod-like part 2b and enabling the knob main body 1 to be oscillatably operated. As shown in FIGS. 1 and 2, the press button 5 is made such that it has a supporting hole 5d into which an end part of the spring 9 for biasing the press button 5 is freely fitted. As shown in FIG. 1, the press button 5 is formed with a slant surface 5e to which a connecting member 8 of the detent rod 7 is press fitted at a lower surface near the supporting hole. As shown in FIG. 8, the press button 5 is formed with guide projections 5c at its upper surface and both side surfaces.

The press button 5 is pushed by the spring 9 when the pressing operation is not performed. As shown in FIG. 2, a head part 5f of the guide projection 5c is fitted to a second width part 4g2, and the rod-like part 5g is fitted to the fourth width part 4g4. When the press button 5 is operated to press, the head part 5f is freely fitted to the first width part 4g1 and is made such that the rod-like part 5g is freely fitted to the width part 4g3.

FIG. 2 is a view for showing a relation between the guide groove 4g and the guide projection 5c. The guide projection 5c is a T-shaped projection comprised of a head part 5f and a rod-like part 5g. The press button 5 is projected and formed at a circumference of a location where the press button 5 is entered into the first cylindrical part 4d. The guide groove 4g is comprised of a first width part 4g1, a second width part 4g2, a third width part 4g3, a fourth width part 4g4, a slant surface 4g5 formed between the first width part 4g1 and the second width part 4g2, a stepped part 4g6 formed between the second width part 4g2 and a third width part 4g3, a slant surface 4g7 formed between the third width part 4g3 and the fourth width part 4g4, and a deep end surface 4g8 formed near the surface of the press button installing member 4.

A size relation between the guide groove 4g and the guide projection 5c will now be described in detail. When it is assumed that a width of the head part 5f is defined as a1, a width of a rod-like part 5g is defined as a2, a width of the first width part 4g1 is defined as b1, a width of the second width part 4g2 is defined as b2, a width of the third width part 4g3 is defined as b3, and a width of the fourth width part 4g4 is defined as b4, the following inequality relationships are established:

a1>a2 b1>b2>b3>b4 and b1>b2>a1>b3>b4>a2

The width a1 of the head part 5f is set to be approximately equal to the width b2 of the second width part 4g2 so as to prevent any looseness. The width a2 of the rod-like part 5g is set to be approximately equal to the width b4 of the fourth width part 4g4 so as to prevent any looseness.

The switch 6 is an over-driving operation switch of a push-lock switch, a hazard switch, or the like. The switch 6 is assembled and constructed to the press button installing member 4 by screw setting a fixed contact point plate 6f and an electrode plate 6e having a terminal 6a to a circumferential part of the second cylindrical part.

The construction of the shift knob structure according to a preferred embodiment of the present invention has been described above, and the action of the shift knob will now be described in detail.

When the press button installing member 4 and the press button 5 are assembled to the knob main body 1, at first, each of the members of the switch 6 is inserted and fitted to form a rear surface side of the press button installing member 4, and the press button 5 is inserted at the rear surface side of the first cylindrical part 4d of the press button installing member 4. One end of the spring 9 is inserted into the supporting hole of the press button 5, and the press button installing member 4 having the switch 6 and the press button 5 assembled therein are fitted to the mounting hole 2d.

One end of the spring 9 is fitted to the supporting projection 2k. The press button installing member 4 is installed such that the engaging claw 4a and the engaging piece 4c are engaged with each of the engaging segments 2g, 2h. The terminal 6a of the switch 6 is press fitted to the electrical conductive wire and automatically connected using a one-finger touch. A further operation, such as a soldering operation, is not required.

Since the press contact installing member 4 functions as a supporting member for the press button 5 and a case member for the switch 6, it is possible to reduce the number of component parts and the number of assembling steps. In addition, the press button installing member 4 is inserted into and fixed to the knob main body 1 to enable the press button 5 and the switch 6 to be assembled to the knob main body 1, whereby the number of assembling steps can be reduced.

Since the stopper 5a formed around the press button 5 abuts against the dropping prevention part 4f, it is possible to prevent it from dropping off the press button installing member 4. Due to this fact, when the press button 5 is assembled to the knob main body 1, it cannot be dropped off and its assembling work can easily be carried out.

In addition, when the press button 5 is pushed, the first cylindrical part 4d is formed around the press button 5, and the guide projection 5c engaged with the guide groove 4g is formed, so that it may be entered into the installing hole 2d in a straight form and is not rotated, thereby resulting in an improved operating feeling of the press button 5.

In addition, when the press button installing member 4 is formed by a die, the guide groove 4g has the first width part 4g1, the second width part 4g2, the third width part 4g3 and the fourth width part 4g4, resulting in that the die pins can be easily pulled out after the resin molding operation. The resin formation can, thus, be easily carried out, and a size of the guide groove 4g can be finished in a high accuracy. With such an arrangement as above, it is possible to provide a press button 5 having no looseness at all. In addition, the guide groove 4g is formed with the slant surface 4g5 and the slant surface 4g7 to enable an engaged feeling to be eliminated when the press button 5 is pressed.

Since the present invention has been constructed as described above, it has the following effects.

(1) The present invention provides a shift knob structure comprised of a press button for use in operating a detent rod, and a press button installing member for inserting the press button in such a way that it may be moved toward or away from the detent rod and a knob main body having the press button installing member therein. The press button is formed with a guide projection at its circumferential part, and the press button installing member has the guide projection engaged with an inner wall of the cylinder part and further formed with a guide groove having a first width part and a fourth width part. As a result of this construction, a looseness between the guide groove and the guide projection can be eliminated, and a press button operating feeling can be improved.

(2) According to another aspect of the present invention, the guide projection is formed with a head part fitted to the first width part and a rod-like part having the fourth width part fitted thereto. As a result, a looseness between the guide groove and the guide projection can be eliminated, and a press knob operation feeling can be improved.

(3) According to another aspect of the present invention, the guide groove forms both a second width part and a third width part between the first width part and the fourth width part, and a relation of a width (b1) of the first width part, a width (b2) of the second groove part, a width (b3) of the third width part and a width (b4) of the fourth width part may become b1>b2>b3>b4. As a result, a size of the guide groove can be finished in a high accuracy when it is formed by a mold with resin, and a looseness of the press button can be eliminated.

(4) According to yet another aspect of the present invention, the guide groove forms an inclination surface between the first width part and the second width part and an inclination surface between the third width part and the fourth width part. As a result, when the press button is pressed, the engaged feeling can be eliminated and, at the same time, when the guide groove is formed by a die, the die pins for forming the guide groove may easily be removed to enable a finished size to be attained in a highly accurate manner.

(5) According to yet another aspect of the present invention, the guide projections are formed at an upper surface and both side surfaces of the press button. As a result, a looseness of the press button can be eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift knob structure, comprising:
    a press button (5) for use in operating a detent rod;
    a press button installing member (4) for inserting said press button (5) in such a way that it is movable toward or away from the detent rod; and
    a knob main body (1) having said press button installing member (4) therein;
    wherein said press button (5) is formed with a guide projection (5c) at its circumferential part, and said press button installing member (4) has said guide projection (5c) engaged with an inner wall of a cylinder part (4d) and is formed with a guide groove (4g) having a first width part (4g1) and a fourth width part (4g4).

2. The shift knob structure as set forth in claim 1, wherein said guide projection (5c) is formed with a head part (5f) fitted to said first width part (4g1) and a rod-like part (5g) having said fourth width part (4g4) fitted thereto.

3. The shift knob structure as set forth in claim 2, wherein said guide groove (4g) forms both a second width part (4g2)

and a third width part (4g3) between said first width part (4g1) and said fourth width part (4g4), and a relation of a width (b1) of said first width part (4g1), a width (b2) of said second width part (4g2), a width (b3) of said third width part (4g3), and a width (b4) of said fourth width part (4g4) is defined as b1>b2>b3>b4.

4. The shift knob structure as set forth in claim 3, wherein said guide groove (4g) forms an inclination surface (4g5) between said first width part (4g1) and said second width part (4g2) and an inclination surface (4g7) between said third width part (4g3) and said fourth width part (4g4).

5. The shift knob structure as set forth in claim 2, wherein said guide projection 5c is formed at an upper surface and both side surfaces of said press button (5).

6. The shift knob structure as set forth in claim 1, wherein said guide groove (4g) forms both a second width part (4g2) and a third width part (4g3) between said first width part (4g1) and said fourth width part (4g4), and a relation of a width (b1) of said first width part (4g1), a width (b2) of said second width part (4g2), a width (b3) of said third width part (4g3), and a width (b4) of said fourth width part (4g4) is defined as b1>b2>b3>b4.

7. The shift knob structure as set forth in claim 1, wherein said guide projection (5c) is formed at an upper surface and both side surfaces of said press button (5).

* * * * *